United States Patent
Manor

(10) Patent No.: US 10,879,790 B2
(45) Date of Patent: Dec. 29, 2020

(54) HIGH EFFICIENCY POWER SUPPLY WITH HIGH POWER FACTOR

(71) Applicant: SLIMPOWER LTD, Bazra (IL)

(72) Inventor: Dror Manor, Hertzliya (IL)

(73) Assignee: SLIMPOWER LTD., Bazra (IL)

( * ) Notice: Subject to any disclaimer, the term of this patent is extended or adjusted under 35 U.S.C. 154(b) by 0 days.

(21) Appl. No.: 16/621,323

(22) PCT Filed: Jun. 12, 2018

(86) PCT No.: PCT/IB2018/054255
§ 371 (c)(1),
(2) Date: Dec. 11, 2019

(87) PCT Pub. No.: WO2018/229658
PCT Pub. Date: Dec. 20, 2018

(65) Prior Publication Data
US 2020/0204064 A1    Jun. 25, 2020

Related U.S. Application Data

(60) Provisional application No. 62/518,014, filed on Jun. 12, 2017.

(51) Int. Cl.
*H02M 1/00* (2006.01)
*H02M 1/42* (2007.01)
*H02M 1/12* (2006.01)
*H02M 3/156* (2006.01)

(52) U.S. Cl.
CPC .......... *H02M 1/4225* (2013.01); *H02M 1/12* (2013.01); *H02M 3/156* (2013.01)

(58) Field of Classification Search
CPC ...... H02M 1/4225; H02M 1/12; H02M 3/156; H02M 1/42
See application file for complete search history.

(56) References Cited

U.S. PATENT DOCUMENTS

| | | |
|---|---|---|
| 5,457,623 A | 10/1995 | Manor |
| 5,598,326 A | 1/1997 | Liu et al. |
| 5,818,707 A | 10/1998 | Seong et al. |

(Continued)

FOREIGN PATENT DOCUMENTS

| | | |
|---|---|---|
| CN | 104716853 A | 6/2015 |
| DE | 19647329 A1 | 5/1997 |
| WO | 2006129152 A1 | 12/2006 |

*Primary Examiner* — Adolf D Berhane
*Assistant Examiner* — Afework S DeMisse
(74) *Attorney, Agent, or Firm* — Blue Filament Law PLLC

(57) ABSTRACT

An AC power supply for providing a DC current for charging a storage capacitor. A boost converter circuit raises the voltage of a rectified input current for charging a capacitor. The power factor of the power supply is maintained above a predetermined level using a power factor controller (PFC). A comparator is used to compare a signal corresponding to the instantaneous voltage of the rectified current with that on the capacitor, and outputs a control signal corresponding to the difference between those two instantaneous voltages. The PFC utilizes this control signal to increase the voltage of the stored charge on the capacitor if the instantaneous voltage of the rectified current comes closer to that on the capacitor by less than a predetermined voltage. Power factor correction instability due to a rising input voltage, is thus eliminated.

14 Claims, 3 Drawing Sheets

(56) References Cited

U.S. PATENT DOCUMENTS

| | | |
|---|---|---|
| 8,446,134 B2 | 5/2013 | Manor et al. |
| 9,455,620 B2 | 9/2016 | Yu et al. |
| 2005/0212501 A1 | 9/2005 | Acatrinei |
| 2016/0204693 A1 | 7/2016 | Mayer et al. |

HIGH EFFICIENCY POWER SUPPLY WITH HIGH POWER FACTOR

FIELD OF THE INVENTION

The present invention relates to the field of AC/DC power supplies for providing current to devices, especially having good power factor correction and low total harmonic distortion.

BACKGROUND

DC power supplies powered by the AC mains, besides their use in powering portable electronic devices such as mobile phones, laptop computers, or to charge batteries such as are known popularly as wall chargers or adaptors, or travel converters, have also widely used as the power sources for LED lighting fixtures. Such LED power supplies for lighting fixtures have a special need for minimal volume, and especially for minimal thickness. Furthermore, because of the widespread use of such lighting fixtures in a typical environment, such as a shopping mall, or an office building, or an underground parking lot, it becomes important that the power factor of the fixture power supplies be maintained at a good level, to avoid possible penalties to the electricity supply company. Such power supplies, if of the "high efficiency" type, generally use a rectifier bridge, with a capacitor output for reservoir and smoothing purposes, feeding a DC/DC converter of the switched mode type, generally a pulse width modulation (PWM) power supply, also capacitor smoothed at its output, to generate a regulated, low voltage DC output. One such design power supply has been described in U.S. Pat. No. 8,446,134 for "High Efficiency AC/DC Power Supply", having a common inventor with the inventor in the present application. However, although the power factor of the power supplies described therein is an improvement over prior art power supplies, there is still room for substantial improvement in the power factor.

There therefore exists a constant need for a power supply which increases still further the line-to-output efficiency while maintaining a high power factor and low total harmonic distortion.

The disclosures of each of the publications mentioned in this section and in other sections of the specification, are hereby incorporated by reference, each in its entirety.

SUMMARY

The present disclosure describes new exemplary systems for high efficiency power supplies having a high power factor, especially as drivers for LED lighting fixtures, and having a low profile such that they can be recessed for instance in ceilings without protruding significantly. The physical size is dependent on the size of the transformers used and on the size of the capacitors used. Therefore, it is of importance to obtain a driver having the minimally feasible volume and thickness possible.

The drivers of such AC/DC power supplies include separate AC/DC and DC/DC power supply stages, the first module incorporating a power factor correction circuit, and providing an output DC voltage having a significantly higher level of ripple, than a conventional single-stage DC power supply. This high level of ripple is enabled by intentionally using a substantially smaller capacitance storage capacitor at the output of the first stage, the AC/DC stage, than in prior art power supplies, which results in optimum use of the stored energy within the capacitors. Since the output capacitor is one of the most critical components of the power supply, both in terms of its volume and in terms of its reliability, the use of a smaller capacity capacitor enables both a decreased volume and a higher reliability to be obtained. In addition, a smaller inrush current is achieved when the power supply is turned on. The second, DC/DC module, can be a conventional PWM or flyback module, which provides a highly smoothed DC output from the high ripple DC input from the first stage.

The smaller valued capacitor enables the use of polyester or polypropylene film capacitors, instead of the electrolytic capacitors of prior art LED drivers. Such capacitors have significantly higher reliability than electrolytic capacitors, and the smaller capacitance value enables capacitors of substantially smaller volume to be used. In addition, there is a limit to the ripple current which electrolytic capacitors can handle, such that for circuits such as those described in this disclosure, which use a large ripple current drawn from the capacitor, the use of electrolytic capacitors is disadvantageous.

There is thus provided in accordance with an exemplary implementation of the devices described in this disclosure, a power supply for providing from an AC source, a DC current for charging a storage capacitor, the power supply comprising:

(i) a boost converter circuit for raising the voltage of a rectified current to a higher voltage for charging the capacitor, (ii) a controller for maintaining the power factor of the power supply above a predetermined level, and (iii) a comparator inputting a first signal corresponding to the instantaneous voltage of the rectified current, and a second signal corresponding to the instantaneous voltage on the capacitor, and outputting a control signal corresponding to the difference between the instantaneous voltages, wherein the controller is adapted to utilize the control signal to increase the voltage on the capacitor, if the difference between the instantaneous voltage of the rectified current and the instantaneous voltage on the capacitor is less than a predetermined voltage.

In such a power supply, maintenance of the instantaneous voltage on the capacitor at a level greater than the instantaneous voltage of the rectified current, ensures that the controller maintains it ability to control the power factor of the power supply. Furthermore, the predetermined voltage may be selected to be of such a level that the power supply can output a large ripple current and use a correspondingly low capacity capacitor.

Additional implementations of power supplies as described above, may further comprise:

(i) a resistor in the path of the DC current, providing a third signal corresponding to the instantaneous value of the DC current, and (ii) a potential divider providing a fourth signal corresponding to the instantaneous voltage of the rectified current, wherein the controller inputs the third signal corresponding to the instantaneous value of the DC current, and the fourth signal corresponding to the instantaneous voltage of the rectified current, and utilizes departure of the phase tracking of the signals in order to maintain the power factor of the power supply.

In any of the above-described power supplies, the predetermined voltage may be selected to be sufficiently small to enable the use of a capacitor having a lower rated voltage than a power supply having the same output characteristics, but without the controller adapted to utilize the control signal to increase the voltage of the stored charge on the capacitor if the instantaneous voltage of the rectified current comes closer to the instantaneous voltage on the capacitor by less than the predetermined voltage. In such a situation, the lower rated voltage of the capacitor may be operative to increase the reliability of the power supply.

In further implementations of the power supplies of the present application, the ripple voltage on the capacitor may be of such a level that the minimum voltage on the capacitor is less than the maximum voltage of the rectified current. In such a situation, the minimum voltage on the capacitor and the maximum voltage of the rectified current occur at different points of time. According to these implementations of the power supplies of this disclosure, these different points of time arise from the phase shift between the rectified output current and the voltage on said capacitor. This phase shift is generated by the reactive nature of the load of the rectifier.

According to yet another implementation of the present disclosure, there is provided a method of enabling the reduction of the voltage rating of capacitors in a power supply for providing from an AC source, a DC current for charging a storage capacitor, the method comprising:

(i) using a boost converter circuit for raising the voltage of a rectified current to a higher voltage for charging the capacitor, (ii) maintaining the power factor of the power supply above a predetermined level, and (iii) increasing the voltage on the capacitor, if the difference between an instantaneous voltage of the rectified current and an instantaneous voltage on the capacitor is less than a predetermined voltage, wherein the capacitor has a value sufficiently low that the ripple on the capacitor is sufficiently large that its minimum voltage is lower than the maximum voltage of the rectified current, thereby enabling reduction of the maximum voltage on the capacitor compared to the voltage thereon in a power supply having a larger capacitor.

In such a method, the minimum voltage on the capacitor and the maximum voltage of the rectified current occur at different points of time. These different points of time may arise from the phase shift between the voltage of the rectified output current and the voltage on the capacitor. This phase shift is generated by the reactive nature of the load of the rectifier.

BRIEF DESCRIPTION OF THE DRAWINGS

The present invention will be understood and appreciated more fully from the following detailed description, taken in conjunction with the drawings in which.

DETAILED DESCRIPTION

Figure 1:
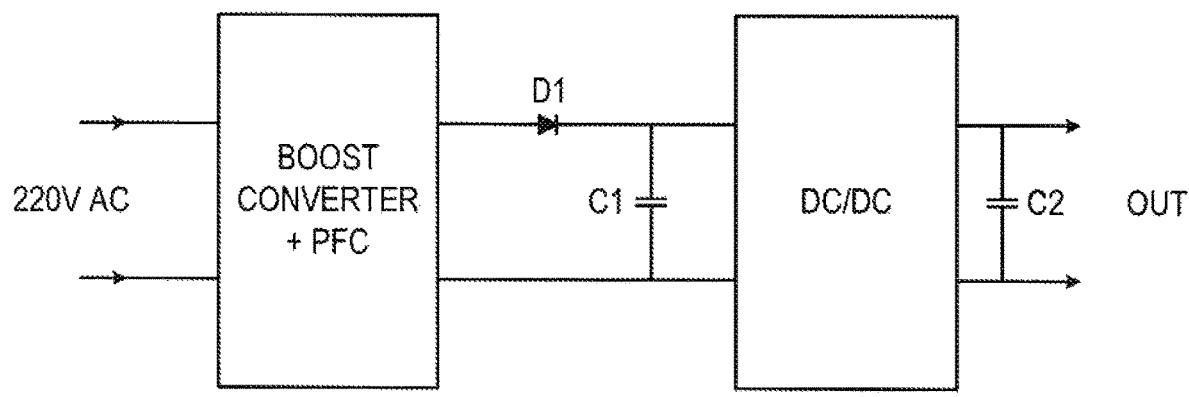
FIG. 1 illustrates schematically a block diagram of the power supplies described in the present disclosure.

Reference is now made to FIG. 1, which illustrates schematically a block diagram of the power supplies described in the present disclosure. The AC input is rectified and converted to DC, in this example using a boost converter, and having an incorporated power factor controller PFC. The diode D1 of the boost converter conveys an output current with a substantial level of ripple, and the excess energy of the output which is not used directly by the load is stored in the capacitor C1. The present disclosure involves methods and circuits for improving the performance of the first stage of the power supply of FIG. 1, namely, the up-converter with its associated power factor controller.

Figure 2:
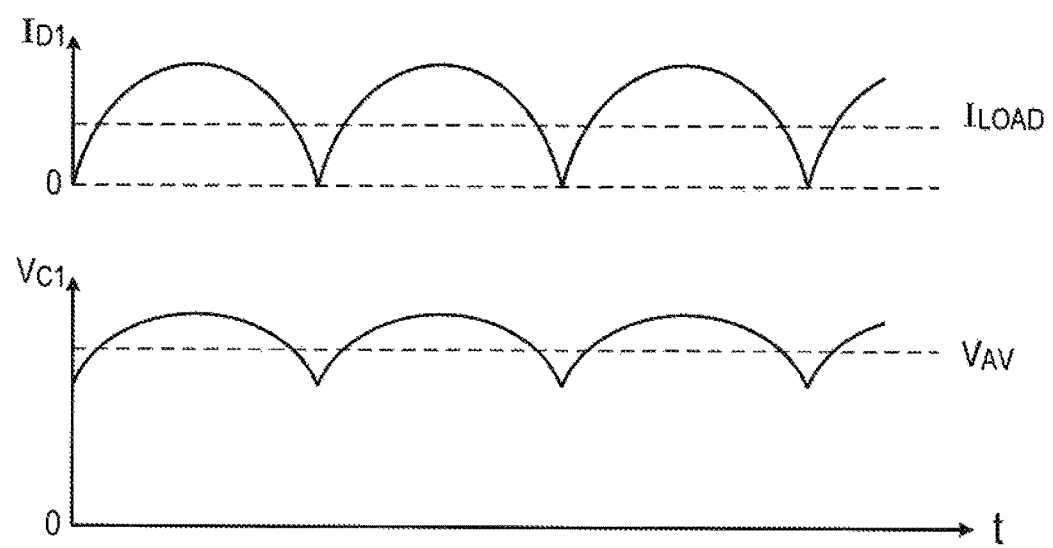
FIG. 2 are graphs of the current output $I_{D1}$ through the diode D1 and of the corresponding voltage on the capacitor $V_{C1}$, as a function of time.

Reference is now made to FIG. 2, which are graphs of the current output $I_{D1}$ from the boost converter first stage of the power supply through the diode D1 as a function of time over several half-cycles, and of the corresponding voltage on the capacitor $V_{C1}$. The average load drawn from the power supply is shown as $I_{LOAD}$ and the equivalent average voltage on the capacitor is shown as $V_{AV}$. When the current from the power supply falls below the level I LOAD, the load will draw its required current from the energy stored in the capacitor C1. The energy stored in a capacitor is given by:

$$E=\tfrac{1}{2}V^2*C$$

where V is the voltage on the capacitor, and C is the capacitance.

The useful energy E which can be drawn from the capacitor is therefore given by:

$$E=\tfrac{1}{2}(V_1^2-V_2^2)*C$$

where $V_1$ is the maximum voltage on the capacitor, and $V_2$ is the minimum. The level of energy which can be withdrawn from the capacitors is a function therefore proportional to the difference between $V_1^2$ and $V_2^2$, times the capacitance of the capacitor. Therefore, for a given requirement of useful stored energy, the larger the ripple allowed, i.e. the larger the value of $(V_1^2-V_2^2)$, the smaller is the value of the capacitor C which can be used, with all of the incumbent advantages of the use of a small capacitor as mentioned above. As an example, a power supply constructed according to the present disclosure having an output of 50 W may use a storage capacitor of typically only 4 µF, where in an equivalent power supply constructed according to prior art methods, a capacitor of 40 µF would be used. The reason for this difference is that the power supply of the present disclosure allows a ripple voltage as large as 100 V out of the typical 400V maximum output voltage, while that of the prior art example would have only 10 V ripple voltage.

Besides the use of capacitors having capacitance values substantially less than those of prior art power supply modules, the advantages of which will be further expounded below in connection with FIG. 4, the presently described power supplies use a PFC controller in order to ensure environmentally acceptable operation. However, the use of a boost converter having an output with such a high ripple level is problematic, since most PFC controllers are unable to handle in their feedback input a high level of AC on the voltage output. This problem is solved by means of a novel configuration of the PFC/boost converter, specific to the present disclosure, as will now be shown in FIG. 3.

The basic up-converter function is first described. The AC input is rectified by the bridge BR2, and passed through the inductor L3 to the diode D1 at the output of which is connected the charge storage capacitor C1. Q7 operates as the switch for this boost converter configuration. The PFC controller provides the switching signals for the switch Q7 from its driver output. The FEEDBACK input of the PFC samples the actual voltage on the capacitor C1 through resistors R3 and R8, and the circuitry of the PFC controller then adjusts the switching to provide the desired average voltage on the capacitor.

One of the limits of this type of boost converter circuits with a power factor controller is that the voltage $V_{in}$ at the input to the converter, i.e. at the output of the rectifier bridge, must be kept lower than the voltage present on the capacitor C1. If this condition is not fulfilled, the PFC controller will cease to control the current level and will behave only like a simple series diode, resulting in a complete degradation of the power factor correction. When lower capacitance capacitors are used, as in the presently described power supplies, this becomes problematic, since the high ripple level involves large swings of the voltage on the capacitor, and if that voltage must always be kept above the instantaneous input voltage, it would appear that the capacitor would need to have a higher working voltage that those of the prior art power supply modules. A method of overcoming this problem is explained in connection with the voltage plots shown in FIG. 4 below. The range of mains input voltages over which the capacitor maintains its intended voltage level, can be from approximately 90V AC to 240V AC. In a typical configuration of the power supplies of the present disclosure, the peak voltage on the capacitor will be approximately 400 V. For AC input voltages of from 240V up to the maximum permitted 265V AC, the compensation circuit enables the peak voltage on the capacitor to rise to no more than approximately 430 V peak, for the period when the AC input voltage is higher than nominal. Since this is generally only for a very short time, the effect on the reliability of the capacitor is minimal.

Figure 4:
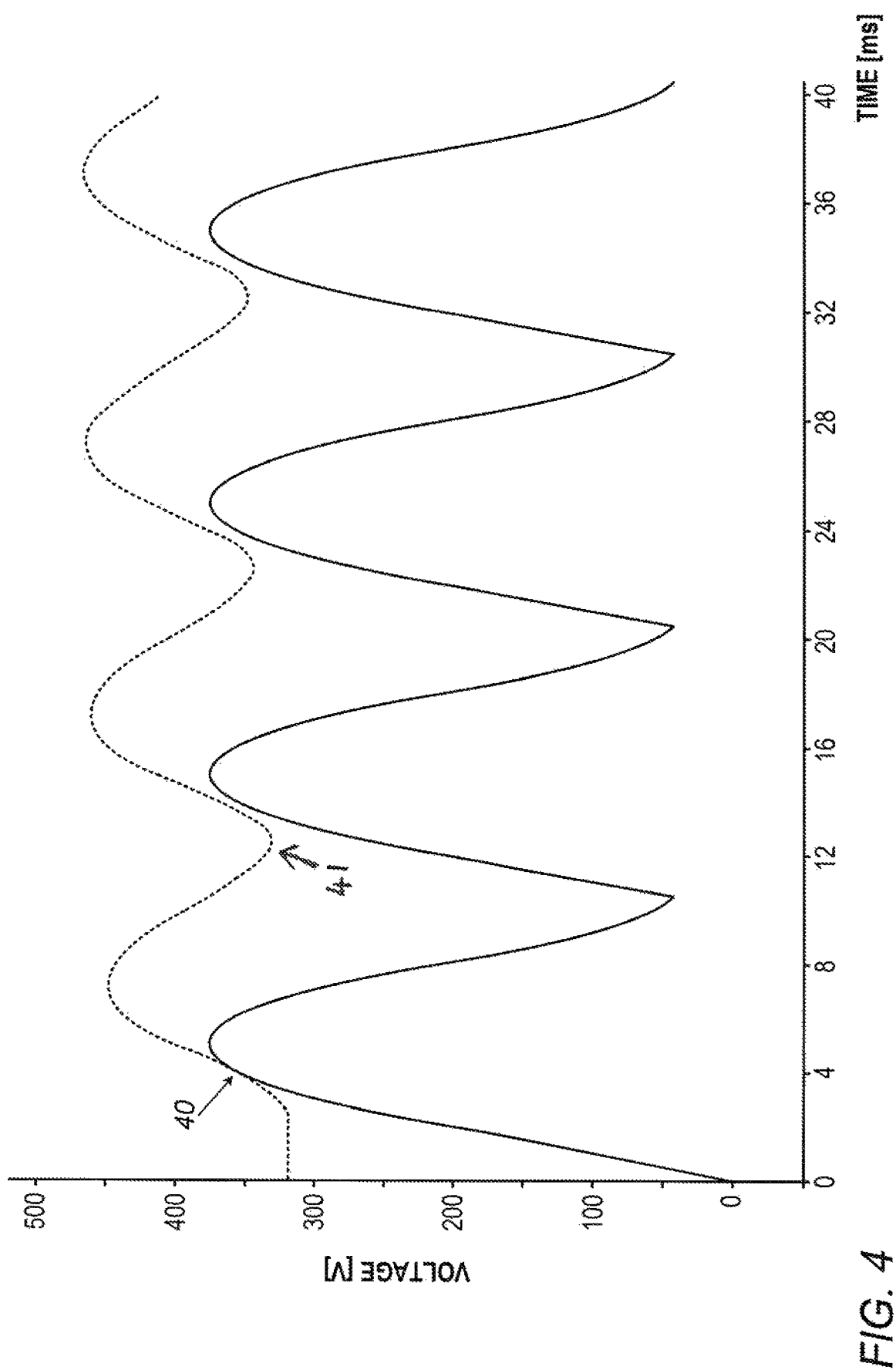
FIG. 4 shows a comparison of the voltage on the voltage on the capacitor the $V_{C1}$, and the input voltage $V_{in}$ measured at the rectified output at the bridge, as a function of time.

Reference is now made to FIG. 4 which illustrates the problem which the novel conversion circuits of the presently described power supply, overcome. In FIG. 4, the top trace is the voltage on the capacitor the $V_{C1}$, while the bottom trace is the input voltage $V_{in}$, measured at the rectified output at the bridge. As is observed, at the point marked 40, the input voltage $V_{in}$ has just reached the voltage on the capacitor, and therefore a compensation circuit is used to raise the voltage on the capacitor in order to avoid cessation of power factor correction.

Figure 3:
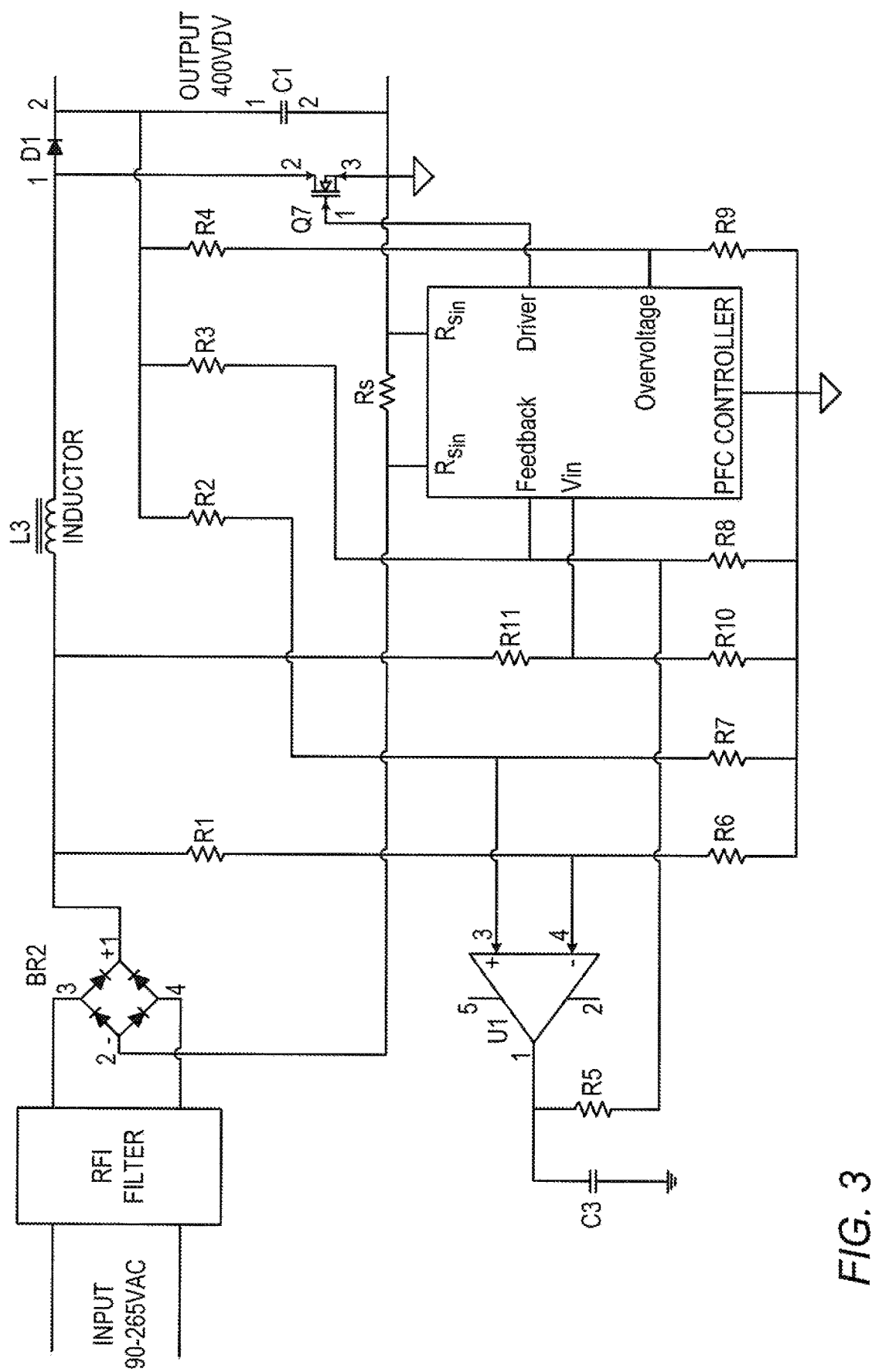
FIG. 3 is a schematic drawing of a configuration of the PFC/boost converter of the present disclosure.

In order to ensure that a finite voltage difference is maintained between the voltage on the capacitor at every point of the waveform and the voltage from the rectified mains input, the circuit of FIG. 3 uses a novel configuration in order to ensure that whenever the rectified input voltage moves closer to the capacitor voltage by more than a predetermined level, the controller raises the voltage level of the capacitor circuit in order to maintain the minimum predetermined difference defined by the circuit design. At the same time the waveform of the capacitor voltage is maintained in its predetermined form, to ensure maintenance of a good power factor. That voltage difference can be kept small, by ensuring tight control.

The operation of the PFC controller as adapted using the additional functionality of the circuits of the present disclosure, is now explained. The usual function of the PFC controller is to ensure that the waveform of the power drawn from the power grid does not depart more than a predetermined level from a sinusoidal form, maintaining a high power factor, PF, and low total harmonic distortion THD. In the presently described circuits, the controller achieves this by tracking the waveform of the input voltage, as reflected by the voltage $V_{in}$ at the output of the rectifier bridge and comparing that input voltage waveform with the waveform of the current input from the diode rectifier bridge BR2. The circuit has to ensure that the input current $I_{in}$ follows the input voltage $V_{in}$ as accurately as possible, this ensuring that a good power factor is maintained. Referring again to FIG. 3, a signal corresponding to the input current $I_{in}$ drawn from the rectifier bridge is obtained by the voltage across a sense resistor $R_S$, situated in the current flow return line of the power supply. A signal corresponding to the input voltage $V_{in}$, is input to the PFC controller from a resistive potential divider R11, R10, between the DC voltage input and ground. The PFC controller circuits continually compare a signal corresponding to the input current and that corresponding to the input voltage, and adjusts the current output loop in the PFC in order to ensure that the level of the output current follows as closely as possible changes in the level of the input voltage. As a result of this compensation, the waveform corresponding to the input current accurately follows the waveform corresponding to the input voltage, as required to ensure good power factor correction. The outcome of this is that the AC component of the voltage on the capacitor is very close to a sinusoidal component. In a driver supplying 0.5 A to a 50 W lighting fixture, constructed using this circuit configuration, a power factor of more than 0.97 and a total harmonic distortion of less than 10%, becomes attainable.

The second control aspect which the PFC circuit of the present disclosure achieves is to adjust the level of the voltage on the capacitor $V_{C1}$ such that it never falls below the level of the voltage input $V_{in}$ from the bridge, or even gets closer to $V_{in}$ by more than a predetermined gap voltage. The circuit uses a comparator U1 in order to perform this function. One input to the comparator is the voltage on the capacitor $V_{C1}$, obtained through the resistor network R2-R7 into pin 3 of U1. The second input to the comparator is a voltage corresponding to $V_{in}$, obtained through the resistor network R1-R6. The difference between these two voltages, as output by the comparator, is used to change the feedback input into the PFC controller obtained from the R3-R8 resistor network, in order to raise the voltage on the capacitor $V_{C1}$, in order to keep the difference between $V_{in}$ and $V_{C1}$ greater than the predetermined gap voltage. By this means, the potential power factor correction instability due to a rising input voltage, is eliminated. The output of the comparator can be damped by use of and additional small capacitor C3, to avoid overshoot and other sharp changes in the voltage control feedback circuit.

In order to achieve the above two functions, the PFC controller must be of a type which has completely separate circuits for determining the overvoltage on the capacitor and that measuring the signal for providing feedback to maintain the capacitor voltage within its desired range.

Use of the above described circuit for ensuring that the voltage on the capacitor $V_{C1}$ is always greater than the input rectified voltage $V_{in}$, is functional in enabling the use of lower voltage rated capacitors than in prior art supplies. If such a circuit were not in use, there would need to be a larger voltage gap between the maximum input voltage $V_{in}$ from the bridge, and the voltage $V_{C1}$ allowed on the capacitor, to ensure that this voltage difference never falls to below a predetermined level, which should be made as small as possible. Therefore, in such a prior art supply, the capacitor rated voltage would have to be sufficiently clear from the input voltage to avoid such a voltage "touching" incident, and capacitors having a rated voltage of the order of 500 V need to be used. On the other hand, when the above described circuit is used, since the voltage on the capacitor "tracks" the level of the input voltage in an active manner, a smaller voltage difference can be tolerated, since the circuit actively pushes the capacitor voltage away from the input voltage by the predetermined level. Therefore, the voltage rating of the capacitor can be chosen to have a smaller level above the maximum input voltage that that in prior art power supplies, such a lower voltage rating leading to higher reliability. The capacitor does get to higher voltages, but only for the short periods when the input voltage may reach its maximum allowed level. A typical rated voltage could be 450V, which is 50 v lower than the 500V rating required of the capacitors in a prior art supply.

FIG. 4 can be used to graphically illustrate this difference from the voltage rating of capacitors used in the presently described systems, as compared with those required in prior art power supply modules. As previously stated, an important feature for the power supplies of the present disclosure is the use of capacitors of significantly smaller value than prior art power supplies, and which therefore have a significantly larger output ripple than prior art power supply stages. This large ripple can be seen in the example shown in FIG. 4, where the peak-to-peak ripple on the capacitor has a voltage level of over 100V. In prior art power supply modules, having larger capacitors and hence smaller ripple levels, a typical figure for the ripple voltage on the output capacitor may be only of the order of 10V. In such cases, this small ripple voltage is of such a level that the whole of the capacitor voltage ripple waveform lies at a higher voltage than the maximum input voltage peak. This mandates capacitors having a voltage rating higher than the peak input voltage by the peak-to-peak ripple on the capacitors, plus the voltage gap needed to ensure that $V_c$ always remains higher than $V_{in}$. The presently described circuits use the difference in phase between the input current (and hence also the input voltage) and the voltage on the capacitor, this phase difference arising from the reactive load of the bridge output current. As a result, the lowest ripple voltage level on the capacitor does not occur at the same point of time as the peak voltage of the input voltage. Hence, the minimum voltage on the capacitor can actually fall below the peak input voltage, as shown in FIG. 4. This feature enables compensation to be made for the ensuing larger ripple voltage on the capacitor of the presently described power modules, by enabling the lower levels of the capacitor ripple voltage $V_c$ to descend into the troughs below the peak of the rectified input voltage $V_{in}$, as shown at point 41 of the voltage traces of FIG. 4. However, at any particular point of time, it is noted that the input voltage is always less than the voltage on the capacitor, such that the PFC can maintain proper control of the input current drawn by the power supply module. This lower voltage level, together with the small voltage gap mentioned above, resulting from the control circuit around the comparator U1, enables capacitors of lower voltage rating, and hence of smaller size and longer lifetime, to be used in the power supplies of the present disclosure.

Although the functional operation of the power supply module has been described in the exemplary circuit of FIG. 3 as an analog circuit, it is to be understood that the same functional operation can also be achieved using a microcontroller, with digital manipulation of the various voltage levels. Such a microcontroller can even provide wider options for control than can be provided by the analog type of control circuits, an example of which is shown in FIG. 3.

It is appreciated by persons skilled in the art that the present invention is not limited by what has been particularly shown and described hereinabove. Rather the scope of the present invention includes both combinations and sub-combinations of various features described hereinabove as well as variations and modifications thereto which would occur to a person of skill in the art upon reading the above description and which are not in the prior art.

I claim:

1. A power supply for providing from an AC source, a DC current for charging a storage capacitor, said power supply comprising: a boost converter circuit for raising the voltage of a rectified current to a higher voltage for charging said capacitor; a controller for maintaining the power factor of the power supply above a predetermined level; and a comparator inputting a first signal corresponding to an instantaneous voltage of said rectified current, and a second signal corresponding to an instantaneous voltage on said capacitor, and outputting a control signal corresponding to the difference between said instantaneous voltages, wherein said controller is adapted to utilize said control signal to increase the voltage on the capacitor, if the difference between said instantaneous voltage of said rectified current and said instantaneous voltage on said capacitor is less than a predetermined voltage.

2. The power supply according to claim 1 wherein maintenance of the instantaneous voltage on said capacitor at a level greater than the instantaneous voltage of said rectified current, ensures that said controller maintains it ability to control the power factor of said power supply.

3. The power supply according to claim 1, wherein said predetermined voltage is selected to be of such a level that said power supply can output a large ripple current by use of a correspondingly low capacity capacitor.

4. The power supply according to claim 1, further comprising:
a resistor in the path of said DC current, providing a third signal corresponding to the instantaneous value of said DC current; and
a potential divider providing a fourth signal corresponding to said instantaneous voltage of said rectified current,
wherein said controller inputs said third signal corresponding to the instantaneous value of said DC current, and said fourth signal corresponding to said instantaneous voltage of said rectified current, and utilizes departure of the phase tracking of said signals in order to maintain the power factor of said power supply.

5. The power supply according to claim 1, wherein said predetermined voltage is selected to be sufficiently small to enable the use of a capacitor having a lower rated voltage than a power supply having the same output characteristics, but without said controller adapted to utilize said control signal to increase the voltage of the stored charge on the capacitor if said instantaneous voltage of said rectified current comes closer to said instantaneous voltage on said capacitor by less than said predetermined voltage.

6. The power supply according to claim 5, wherein said lower rated voltage of said capacitor is operative to increase the reliability of said power supply.

7. The power supply according to claim 1, wherein the capacitance of said capacitor is of a sufficiently low level that the minimum voltage of the ripple on said capacitor is lower than the maximum voltage of said rectified current.

8. The power supply according to claim 7, wherein said minimum voltage on said capacitor and said maximum voltage of said rectified current occur at different points of time.

9. The power supply according to claim 8, wherein said different points of time arise from the phase shift between said rectified output current and said voltage on said capacitor.

10. The power supply according to claim 9, wherein said phase shift is generated by the reactive nature of the load of said rectifier.

11. A method of enabling the reduction of the voltage rating of capacitors in a power supply for providing from an AC source, a DC current for charging a storage capacitor, said method comprising:
   using a boost converter circuit for raising the voltage of a rectified current to a higher voltage for charging said capacitor;
   maintaining the power factor of said power supply above a predetermined level; and
   increasing the voltage on the capacitor, if the difference between an instantaneous voltage of said rectified current and an instantaneous voltage on said capacitor is less than a predetermined voltage,
   wherein said capacitor has a value sufficiently low that the ripple on said capacitor is so large that its minimum voltage is lower than the maximum voltage of said rectified current, thereby enabling reduction of the maximum voltage on said capacitor compared to the voltage thereon in a power supply having a larger capacitor.

12. The method according to claim 11, wherein said minimum voltage on said capacitor and said maximum voltage of said rectified current occur at different points of time.

13. The method according to claim 12, wherein said different points of time arise from the phase shift between said rectified output current and said voltage on said capacitor.

14. The method according to claim 13, wherein said phase shift is generated by the reactive nature of the load of said rectifier.

* * * * *